Jan. 3, 1950     L. B. COURTOT     2,493,111
PRESSURE REGULATOR
Filed Feb. 1, 1945
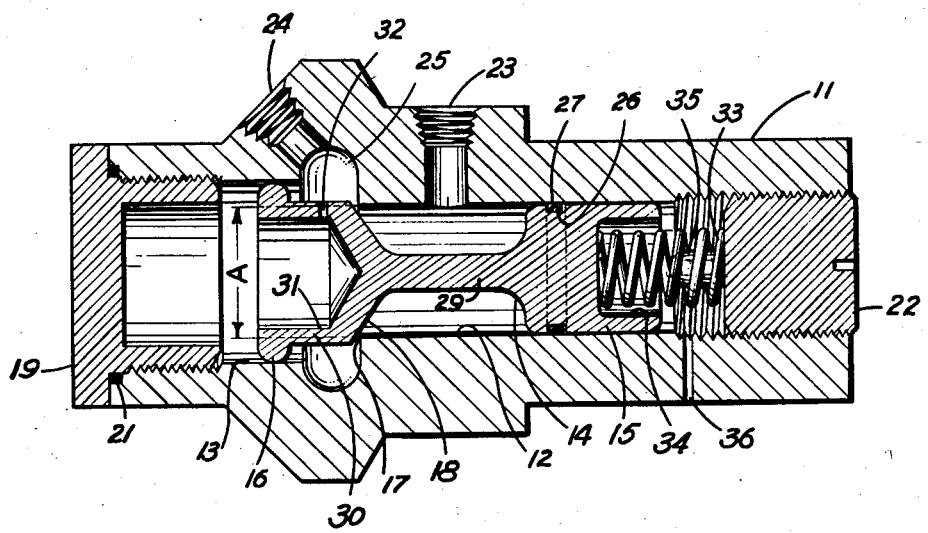
Inventor
Louis B. Courtot
By Richey & Watts
Attorneys Patented Jan. 3, 1950

2,493,111

UNITED STATES PATENT OFFICE 2,493,111

PRESSURE REGULATOR

Louis B. Courtot, Cleveland, Ohio, assignor to The Weatherhead Company, Cleveland, Ohio, a corporation of Ohio Application February 1, 1945, Serial No. 575,669

1 Claim. (Cl. 50—35)

My invention relates to pressure regulators and concerns particularly devices intended to regulate discharge pressure of fluids or liquids delivered from a source at a higher pressure than the desired pressure of the chamber into which the fluid is to be discharged.

In order to eliminate the need for separate lower-pressure pumps and reservoirs, it is frequently desirable to provide means for reducing the pressure of a high-pressure source of fluid. Such higher pressures frequently fluctuate. However, it is often important that the fluid be discharged at a uniform pressure to the apparatus in which it is to be ultimately used, for example, refrigeration apparatus or the like.

Accordingly, it is an object of my invention to provide apparatus for reducing the pressure of fluid received from a supply source, and closely regulating the pressure at which it is to be delivered. A further object is to provide such apparatus in which the discharge pressure may be adjusted readily over a considerable range.

Another object is to provide a regulator structure, including a valve which is balanced insofar as concerns the higher pressure of the fluid supplied, and which will not be disturbed by fluctuations in the high-pressure. Another object is to provide a regulator suitable for large ratios of pressure reduction. Still another object is to provide a regulator structure in which external means are provided for adjusting the pressure maintained.

A further object is to provide a regulator which is free from any effect similar to acting as a check-valve in the event of reduction in the supply pressure. An object of the invention is to provide a valve for pressure regulation which will normally be open or is biased to open position, and which is so arranged that there is little likelihood that it will become stuck in a closed position.

Still another object is to provide a pressure regulator in which the high-pressure fluid to be throttled has its pressure balanced against an adjustable, resilient, force-producing member.

Other and further objects, features and advantages of the invention will become apparent as the description proceeds.

In carrying out the invention in a preferred form thereof, I provide a casing having a bore, including two cylindrical portions or chambers of different diameters, one being a continuation of the other and in alignment therewith; and I provide a valve member or piston having portions fitting the two different diameter portions of the bore.

The piston is made with a tapering portion forming a valve disc acting in cooperation with a valve-seat formed at the junction between larger and smaller diameter portions of the bore in the casing. An inlet port is provided for admitting high-pressure fluid to the smaller diameter portion of the bore, and an outlet port is provided for taking the fluid from the larger diameter portion of the bore beyond the valve. Furthermore, the piston is so arranged so that the pressure of the discharged fluid is balanced against a resilient force-producing means such as a spring arranged to tend to open the valve.

A better understanding of the invention will be afforded by the following detailed description considered in conjunction with the accompanying drawing, the single figure of which constitutes a longitudinal section of an embodiment of the invention. The scope of the invention will be pointed out in the claim appended hereto.

The embodiment of the invention illustrated in the drawing comprises a casing 11 having a bore therein substantially cylindrical with one portion 12 of smaller diameter than another portion forming a chamber 13. A slidable valve member or piston 14 is provided having a small diameter portion 15 adapted to fit the portion 12 of the casing bore and the larger diameter portion 16 adapted to fit the larger diameter portion 13 of the casing bore. The shoulder formed at the end of the narrow bore portion 12 where the diameter thereof increases, forms a valve seat 17. To cooperate with the valve seat 17 a suitable valve surface or valve disc is formed on the sliding valve member or piston 14, for example a tapering valve surface 18 may be provided.

The ends of the bore in the casing 11 are closed by suitable means. For example, the end portions of the bore may be threaded to receive threaded fittings. In the arrangement illustrated a screw-cap 19 is provided at the large end of the bore, having a packing ring 21 to form a tight seal. An adjusting screw 22 is provided at the other end of the bore for the purpose of varying the pressure maintained by the regulator in a manner which will be described in greater detail hereinafter.

An inlet port 23 is provided which communicates with the smaller portion 12 of the casing 11, and an outlet port 24 is provided which communicates with the larger diameter portion 13 of the bore in the casing 11. Preferably an annular enlargement 25 in the latter portion of the bore is provided with which the outlet port 24 directly communicates.

A peripheral groove 26 is formed in the portion 15 of the sliding valve member 14 to receive a packing ring 27 in order to form a seal in the smaller diameter portion 12 of the bore in the casing 11. The sliding valve member or piston 14 may take the form somewhat of a bobbin or spool consisting of two cylindrical portions joined by a stem or reduced diameter portion 29. One cylindrical portion is represented by the part 15 of the piston which slides in the narrow bore 12, and the other cylindrical portion may have substantially the diameter of the larger bore 13. However, preferably, the cylindrical portion of the other end of the piston 14 takes the form of a cylinder 30 having a smaller diameter than the larger bore 16 in order to provide adequate clearance for the passage of fluid to the outlet port 24. In the arrangement illustrated, a bearing portion or guide 16, to which reference has already been made, is formed integral with the larger diameter cylinder 30 at the end thereof, and is preferably adapted to make a sliding fit in the larger bore 13. The inner portion of the larger diameter cylindrical part 30 may be hollowed out to form a recess 31 and a vent 32 is provided in the wall of the cylindrical part 30 to form a communication channel between the hollow or recess 31 and the annular enlargement 25 in the larger chamber 13, thus the vent 32 provides a passageway between the closed end of the larger chamber 13 and the outlet port 24.

For the purpose of resiliently balancing the valve member or piston 14 in the open valve position, suitable means are provided which, in the specific form illustrated, take the form of a compression spring 33. For supporting or locating the ends of the spring 33 a hollow 34 may be provided in the piston part 15, and a pin 35 may be secured to the inner-surface of the adjustable screw 22.

Preferably a vent 36 is provided in the casing 11 between the smaller cylindrical portion 15 of the piston 14 and the adjusting screw 22 for the purpose of discharging any accumulation of fluid leaking past the packing 27, in order to make its motion wholly responsive to the balance in force between the pressure acting on the larger diameter end 16 and the compression spring 33.

When the valve is closed by the valve-disc or tapering valve-portion 18 being in contact with the valve seat 17, the pressure of the fluid supplied through the inlet port 23 acts equally and oppositely toward both ends of the piston or the sliding valve member 14 so that there is an exact balance with respect to the inlet pressure. When the valve is slightly open, throttling the inlet fluid, this balance remains undisturbed because the inlet pressure still acts upon the same areas in opposite directions.

Owing to the fact that the inlet pressure is balanced, the operation does not depend upon the relative valves of inlet and outlet pressure, and a large ratio of inlet to outlet pressure may be obtained.

The outlet fluid pressure is balanced upon the portions of the sliding valve member outside the projection of cross-sectional area of the smaller chamber 12. However, the outlet fluid pressure acting upon the area A, equalling the cross-sectional area of the chamber 12, is free to act against the spring 33 for moving the sliding valve 14 toward the valve-closing position. The fact that the chamber 13 is larger than the chamber 12 facilitates manufacture assembly of the apparatus. However, from a standpoint of operation, since only the area A is effective, the portion of the chamber 13 in which the bearing 16 slides need not be larger than the chamber 12 provided the peripheral portion 25 is large enough to receive the valve parts 17 and 18 and to admit exhaust fluid to the port 24 and the vent 32.

The sliding valve member or piston 14 opens or closes until the valve setting is such as to throttle the inlet fluid just sufficiently so that the force of the pressure of the fluid at the outlet port 24 balances the force of the spring 33. For adjustment of the outlet pressure to be maintained by the valve, the force of the spring 33 is varied. In the particular apparatus illustrated, this is accomplished by rotation of the adjusting screw 22 which is shown as slotted at 37 to receive a suitable adjusting tool such as a screwdriver, for example.

Having thus described my invention so that others skilled in the art may be able to understand and practice the same, I state that what I desire to secure by Letters Patent is defined in what is claimed.

What I claim is:

A pressure regulator comprising a casing having aligned cylindrical bores of different diameters with a generally radially extending wall at their junction forming a valve seat, a valve member having first piston means sliding in the smaller of said bores and second piston means having guide means sliding in the larger of said bores, a reduced portion connected to said first piston means, generally radial wall means merging with said second piston means and said reduced portion, a radially outer portion of said wall means being formed for engaging said valve seat, that portion of said second piston means extending from the valve seat engaging portion of said wall to said guide means having a minimum diameter at least equal to that of said smaller bore, an inlet port in said casing communicating with said smaller bore and overlying said reduced valve portion, outlet port means in said casing communicating with said larger bore between said valve seat and said second piston means, means closing off the end of said larger bore forming a chamber with said second piston means, passageway means of relatively small area formed in said second piston means to communicate static pressure from said outlet port means to said chamber, and means resiliently biasing said valve member to the open position.

LOUIS B. COURTOT.

REFERENCES CITED

The following references are of record in the file of this patent:

UNITED STATES PATENTS

| Number | Name | Date |
|---|---|---|
| 150,386 | Young | Apr. 28, 1874 |
| 297,373 | Freese | Apr. 22, 1884 |
| 298,687 | Gooding | May 13, 1884 |
| 383,226 | Hohenstein | May 2, 1888 |
| 419,440 | Hennebohle | Jan. 14, 1890 |
| 1,131,341 | Dieter | Mar. 9, 1915 |
| 1,233,885 | Kuenhold | July 17, 1917 |
| 2,087,085 | Davis | July 13, 1937 |

FOREIGN PATENTS

| Number | Country | Date |
|---|---|---|
| 5,203 | Great Britain | Mar. 2, 1904 |
| 7,427 | Germany | Oct. 11, 1879 |
| 28,605 | Great Britain | Dec. 14, 1896 |
| 257,788 | Great Britain | Nov. 17, 1938 |
| 364,878 | Italy | May 2, 1888 |

Certificate of Correction

Patent No. 2,493,111 January 3, 1950

LOUIS B. COURTOT

It is hereby certified that errors appear in the printed specification of the above numbered patent requiring correction as follows:

Column 4, list of references cited, line 60, for the date "May 2, 1888" read *May 22, 1888*; line 71, for "Nov. 17, 1938" read *Sept. 9, 1926*; line 72, for "May 2, 1888" read *Nov. 17, 1938*;

and that the said Letters Patent should be read with these corrections therein that the same may conform to the record of the case in the Patent Office.

Signed and sealed this 18th day of July, A. D. 1950.

[SEAL]

JOE E. DANIELS,
*Assistant Commissioner of Patents.*